F. MAHNKEN & L. L. VAN NICE.
CROCHETED ARTICLE AND METHOD OF PRODUCING THE SAME.
APPLICATION FILED APR. 2, 1914.
1,139,989.
Patented May 18, 1915.
2 SHEETS—SHEET 1.
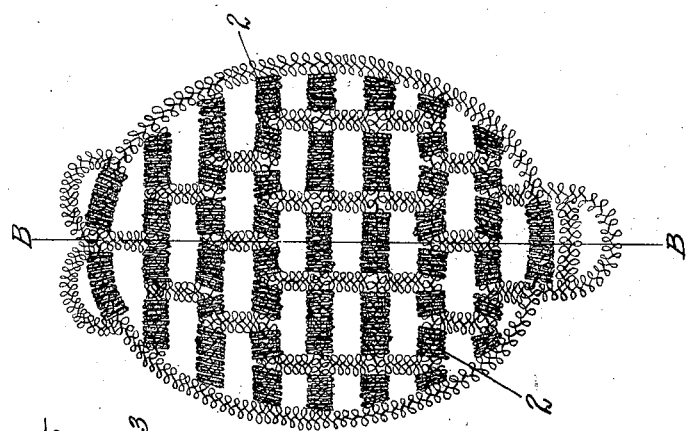
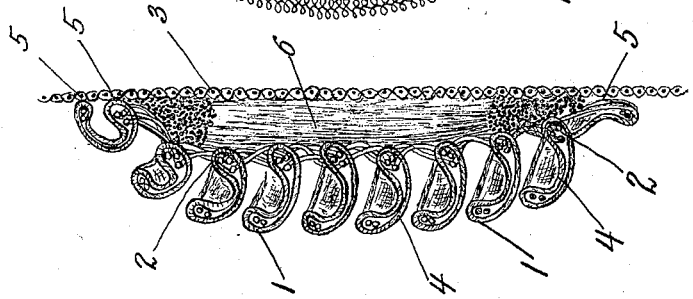
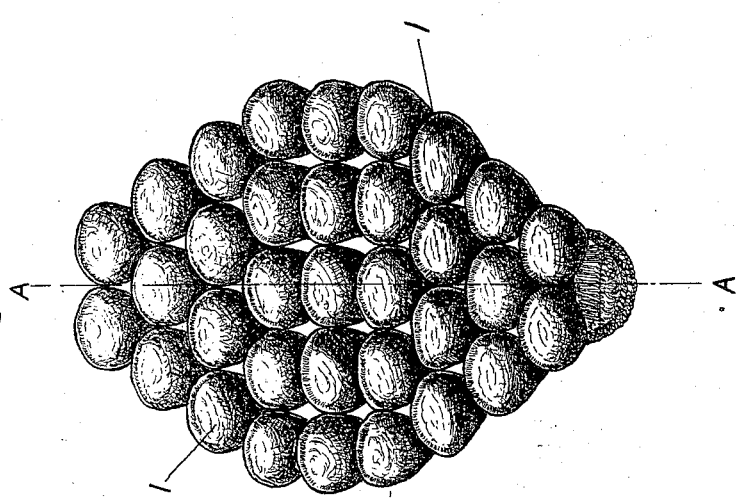
Witnesses
Inventors
Attorneys

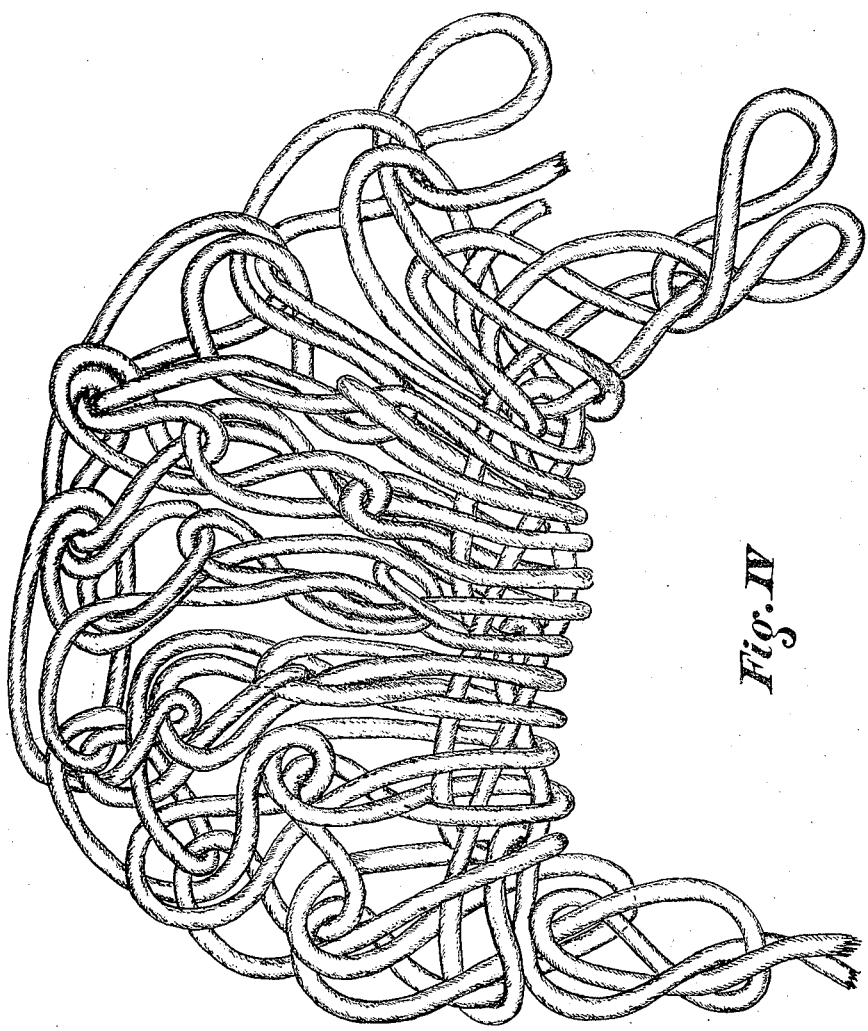
Fig. IV

UNITED STATES PATENT OFFICE.

FLORA MAHNKEN AND LOUISE L. VAN NICE, OF DENVER, COLORADO, ASSIGNORS TO HUNT AND VAN NICE, OF DENVER, COLORADO, A COPARTNERSHIP COMPOSED OF GEORGE A. HUNT, LOUISE L. VAN NICE, AND EMMA E. HUNT.

CROCHETED ARTICLE AND METHOD OF PRODUCING THE SAME.

1,139,989.  Specification of Letters Patent.  Patented May 18, 1915.

Application filed April 2, 1914. Serial No. 829,153.

*To all whom it may concern:*

Be it known that we, FLORA MAHNKEN and LOUISE L. VAN NICE, citizens of the United States, residing at Denver, in the county of Denver and State of Colorado, have invented certain new and useful Improvements in Crocheted Articles and Methods of Producing the Same; and we do hereby declare the following to be a full, clear, and exact description of the invention, such as will enable others skilled in the art to which it appertains to make and use the same.

This invention relates to crochet work and has for an object to provide a method for producing, by crocheting, an article with independently upstanding parts in imitation of the petals of natural objects such as pine cones, flowers and the like.

A further object of the invention is to provide a new article of manufacture consisting of a crocheted imitation of a pine cone.

With these and other objects in view the invention provides the method or plan of work illustrated and produces the article shown in the accompanying drawings in which like characters of reference indicate corresponding parts throughout the several views and in which—

Figure I. is a top plan view of a completed crocheted imitation pine cone—shown conventionally. Fig. II. is a longitudinal section on lines A—A of Fig. I. and B—B of Fig. III. showing the cone mounted upon a fabric and showing the padding ordinarily employed in mounting, all shown conventionally. Fig. III. is a bottom view of the crocheted imitation pine cone shown in Fig. I., shown conventionally. Fig. IV. is a greatly enlarged view of a single petal of a crocheted imitation pine cone, illustrating the method of crocheting herein employed to give the desired shape to crocheted imitation petals in general.

No effort has been made in Figs. I., II. and III. to correctly show the details of the stitch employed as the views are necessarily too small to permit of such showing.

In the drawings we have shown, and illustrated the method of producing, an imitation pine cone, not only because we desire to protect the same as a new article of manufacture but also because it is the article best illustrating the method which is a subject of this application. The same method is employed in producing crocheted imitation flowers and the like—that is, any object having parts or petals which are attached together at the base but which stand out separately or independently and especially those whose parts or petals are more or less cupped in shape. The particular order of stitches employed in producing the crocheted imitation pine cone is hereinafter set forth specifically and in detail.

It will be apparent that, in order for the petals 1 to maintain a substantially upright position, a material should be used which has a substantial body and for this reason a yarn made of wood fiber is found very satisfactory. Also it will be apparent that no material now known, suitable for this class of work, would have sufficient stiffness, when crocheted into an imitation petal, to maintain the required position unless the work be closely drawn or woven together. Therefore a close or solid style of work and the use of a substantial and comparatively stiff material are necessary in order to produce the best results even with the method of stitching hereinafter described.

Our method of producing crocheted imitations of petaled objects is to crochet one petal at a time, forming each with a substantial base portion as at 2 and crocheting the base portions together into the form in which the petals are arranged in the object being imitated and thus forming a completed crocheted imitation of said object, which imitation may be attached by any suitable means in common or ordinary use, to any article desired to be decorated, as fabric 3. Each petal is formed by crocheting chains 4 outwardly from said base portion to the rim of the petal and there ending the chains in loops and in crocheting these loops together into a chain forming the edge of the petal which chain rim may be contracted to a greater or less extent in order to give to the petal the same degree of concavity or convexity as in the natural petal being imitated.

As an illustration of the working out of our method and the production thereby of the new article of manufacture which is a part of the subject matters hereof, we submit, in the language generally employed in giving instructions for the execution of crochet work, the following directions for the production of a crocheted imitation pine cone by our method, to-wit:

Chain 8, join in a ring. Into this ring put in 1 single crochet, 1 double crochet, 1 treble crochet, 1 double treble crochet (3 times over the needle) 1 treble crochet, 1 double crochet, 1 single crochet. This forms one petal. Turn.

Chain 5, 1 double crochet into center of petal (over chain), chain 2, 1 double crochet into last single crochet, thus forming 2 openings for next 2 petals, turn.

* 1 single crochet, 1 double crochet, 1 treble crochet, 1 double treble crochet, 1 treble crochet, 1 double crochet, 1 single crochet into first opening, repeat from * into second opening. Turn.

Chain 5, 1 double crochet into center of first petal, chain 2, 1 double crochet into center of second petal, chain 2, 1 double crochet into the last single crochet. (This forms 3 openings). Fill openings with petals; continue until you have five petals in row. Turn, chain 5, 1 double crochet between 1st and 2nd petals, chain 2, 1 double crochet between 2nd and 3rd petals, chain 2, 1 double crochet between 2nd and 3rd petals, continue until you have 5 openings to be filled with petals. Make 1 more row of 5 petals (3 rows of 5 petals). Turn.

Chain 5, 1 double crochet into center of 2nd petal, chain 2, 1 double crochet into 3rd petal, chain 2, 1 double crochet into fourth petal, chain 2 (skip 5th petal), 1 double crochet into last single crochet (4 openings for 4 petals). Fill openings with petals. Turn.

Chain 5, 1 double crochet into 2nd petal, chain 2, 1 double crochet into 3rd petal, chain 2, 1 double crochet (skip 4th petal) into last single crochet (3 openings for 3 petals). Fill openings with petals. Turn.

Chain 5, 1 double crochet into 2nd petal, chain 2, 1 double crochet, (skip 3rd petal) into last single crochet. Fill openings with petals.

The result of the carrying out of the foregoing directions will be the article shown conventionally at Figs. I. and III. which may then be attached to a fabric as 3 in any suitable manner as by sewing the edges thereof to the fabric as at 5, first padding it with yarn or other suitable material as indicated at 6 for rounding out the imitation cone into a convexity approximating the shape of a half of a real pine cone.

What we claim is:

1. A method of producing imitation petals by crocheting, consisting of forming a base portion, forming chains from said base portion to the rim of the petal, terminating said chains in loops, forming said loops into a chain rim for said petal and contracting said rim to produce convexity or concavity in said petal.

2. The method of producing an imitation petal consisting in crocheting the body of the petal, crocheting a rim about such body, and then contracting the rim and thereby producing a convexity of the body.

3. A method of producing imitation petaled objects by crocheting consisting of crocheting one petal at a time, forming each with a base portion and crocheting the base portions together, each petal being formed by forming chains from said base portion to the rim of the petal, terminating said chains in loops, forming said loops into a chain rim for said petal and contracting said rim to produce convexity or concavity in said petal.

4. An imitation petal comprising a crocheted body and a crocheted rim, the rim being under sufficient tension to produce convexity of the body.

5. As a new article of manufacture, an imitation pine cone formed of a plurality of petals each comprising a crocheted body and a crocheted rim, the latter being under tension whereby the body is held in convexed position.

In testimony whereof we affix our signatures in presence of two witnesses.

FLORA MAHNKEN.
LOUISE L. VAN NICE.

Witnesses:
CARLE WHITEHEAD,
ALBERT L. VOGL.

Copies of this patent may be obtained for five cents each, by addressing the "Commissioner of Patents, Washington, D. C."